(12) United States Patent
Etcheverry

(10) Patent No.: US 9,413,198 B2
(45) Date of Patent: Aug. 9, 2016

(54) SYNCHRONOUS MACHINE HAVING A FLUX EXCITER REMOTE FROM THE ROTOR

(71) Applicant: Fred W. Etcheverry, Santa Cruz, CA (US)

(72) Inventor: Fred W. Etcheverry, Santa Cruz, CA (US)

( * ) Notice: Subject to any disclaimer, the term of this patent is extended or adjusted under 35 U.S.C. 154(b) by 220 days.

(21) Appl. No.: 14/271,380

(22) Filed: May 6, 2014

(65) Prior Publication Data
US 2015/0326077 A1    Nov. 12, 2015

(51) Int. Cl.
| | |
|---|---|
| *H02K 1/24* | (2006.01) |
| *H02K 21/12* | (2006.01) |
| *H02K 21/14* | (2006.01) |
| *H02K 21/40* | (2006.01) |

(52) U.S. Cl.
CPC ............. *H02K 1/246* (2013.01); *H02K 1/243* (2013.01); *H02K 21/12* (2013.01); *H02K 21/14* (2013.01); *H02K 21/40* (2013.01)

(58) Field of Classification Search
CPC ....... H02K 1/27; H02K 1/2706; H02K 1/276; H02K 16/00; H02K 16/02; H02K 21/00; H02K 21/026; H02K 21/12; H02K 21/14; H02K 1/246; H02K 1/243; H02K 21/40
See application file for complete search history.

(56) References Cited

U.S. PATENT DOCUMENTS

| | | | | |
|---|---|---|---|---|
| 4,104,716 A * | 8/1978 | Ruggeri | ................... | H01F 29/14 363/102 |
| 5,051,641 A * | 9/1991 | Weh | ......................... | H02K 1/27 310/162 |
| 5,905,321 A * | 5/1999 | Clifton | ................. | F16C 32/0459 310/113 |
| 6,734,593 B2 * | 5/2004 | Lawes | ..................... | H02K 19/24 310/165 |
| 7,990,019 B2 * | 8/2011 | Sung | ....................... | H02K 21/14 310/114 |
| 8,390,168 B2 * | 3/2013 | Hsu | ......................... | H02K 1/246 310/257 |
| 2009/0134723 A1 * | 5/2009 | Takeuchi | .............. | H02K 21/026 310/48 |
| 2010/0176679 A1 * | 7/2010 | Ichiyama | ................ | H02K 16/00 310/156.35 |
| 2012/0133231 A1 * | 5/2012 | Hayakawa | .............. | H02K 21/24 310/156.37 |
| 2013/0057102 A1 * | 3/2013 | Yamada | ................... | H02K 1/27 310/156.07 |
| 2013/0277131 A1 * | 10/2013 | Becker | ..................... | B62M 6/55 180/206.4 |
| 2014/0285048 A1 * | 9/2014 | Seo | ....................... | H02K 1/2786 310/156.12 |

OTHER PUBLICATIONS

Variable Frequency AC Motor Drives, David Fenney, The Institution of Engineering and Technology, 1988, IBSN-10: 08636411142.
Electric Power and Controls, Skvareenina, Dewitt, Pearson-Prentice Hall, 2004, ISBN 0-13-113045-5.

* cited by examiner

*Primary Examiner* — Michael Zarroli

(57) ABSTRACT

A brushless synchronous electrical machine with an unwound rotor comprising poles excited through axial air gaps at both ends of the rotor by stationary exciters comprising high permeable cores and electrical winding.

5 Claims, 5 Drawing Sheets

SYNCHRONOUS MACHINE HAVING A FLUX EXCITER REMOTE FROM THE ROTOR

CROSSED-REFERENCED TO RELATED APPLICATIONS

Priority Claim

BACKGROUND

Prior Art

The following is a tabulation of some prior art that presently appears relevant:

U.S. Patents

| Patent Number | Kind Code | Issue Date | Patentee |
| --- | --- | --- | --- |
| 3,484,635 | A | Jan. 16, 1968 | M. KELLOR, JR |
| 4,250,424 | A | Feb. 10, 1981 | HIROCHI SENTO/et al |
| 8,390,168 | B2 | Mar. 5, 2013 | JOHN S. HSU |

OTHER PUBLICATIONS

Variable Frequency AC Motor Dives, David Fenney, The Institution of Engineering and Technology, 1988, ISBN-10: 08636411142.

Electric Power and Controls, Skvarenina, DeWitt, Pearson-Prentice Hall, 2004 ISBN 0-13-113045-5)

BACKGROUND OF INVENTION

1. Technical Field

This invention relates to electric machines, and more specifically to brushless electronically controlled double-fed synchronous motors and generators.

2. Related Art

Improvements in solid state electronics to handle high voltage and power, solid state miniaturization to construct smaller microprocessors with increased capabilities, algorithms, sensors such as hall effect devices, electrical storage technology such as rechargeable batteries and super capacitors, advance electric machine technology to make portable application such as electric vehicle traction motors, portable power tools, robots and wind turbine generators.

3. Prior Art

Synchronous double-fed electric machines developed from early induction motors with wound rotors. Induction motors with squirrel cage only rotors are difficult to start especially under a load. The wound rotors were connected to resistors though a slip-ring-brush assembly. After the induction motor reached synchronous speed, the resistor circuit was eliminated and the induction motor continued to operate at synchronous speed minus slip.

Synchronous double-fed generators developed from these motors. After they were brought up to synchronous speed as motors, they were switched online as generators. Early synchronous double-fed machine exhibited unstable operation. It was soon learned empirically and theoretically that this instability could be mitigated by controlling the wound rotor excitation current.

Synchronous electrical machines contain a wound stator and a rotor with magnetic poles. When operating as a motor, usually 3-phase power is fed to the stator creating a rotating magnetic field in step with the source current. The rotor rotates at a speed and direction determined by the frequency and phase of the applied power. When this machine is used as a generator, power flows from the stator to a load.

FIG. 1 (Prior Art) shows a family of V-curves illustrating the range of control of synchronous double-fed motors. For a given stator current, the wound rotor excitation current can be adjusted to keep this motor from instability and adjust reactance and power factor.

Early exciter control was accomplished by relays and rheostats. Advances in solid state electronics introduced electronic control. Such control often monitors synchronous double-fed machine parameters by instrumentation and responds rapidly by adjusting the excitation current to the rotor winding and current to the stator.

Electronic instrumentation can measure shaft angle, stator current and voltage from which torque angle and power factor can be determined. In response electronic control can adjust exciter current to adjust power factor to match the power source thus increasing efficiency. Electronic control can respond to mechanical transients presented to motors and it can respond to electrical transients to generators.

Advances in solid state electronics introduced variable frequency power supplies (power inverters) in the '80s. These inverters have increased the versatility of synchronous motors. No longer are they restrained to operate at a synchronous speed determined by line frequency. No longer did they have to be a combination of induction motor and synchronous machine just to be able to start. Synchronous motors can be started by setting the inverter at a low frequency. These motors can then be brought up to a desired speed by raising the frequency of the inverter. Utilizing electronic control, synchronous generators can be brought up as motors and then phase locked as a generator to the grid. Synchronous generators operating as wind turbine can be adjusted by electronic control to optimize torque and efficiency.

The development of variable frequency drives in the '80 can be found in Variable Frequency AC Motor Dives, David Fenney, The Institution of Engineering and Technology, 1988, ISBN-10: 08636411142.

Neglecting the brush slip-ring-brush assembly, theoretically synchronous double-fed machines using electronic control have the greatest torque density, power density and efficiency. The slip-ring-brush assembles also increases the cost of synchronous double-fed machines since they require frequent maintenance to replace components of the slip-ring-brush assembles from the effects of arcing and scoring. Such arcing also places noise on the rotor winding compromising electronic control.

Several attempts at constructing brushless machines have utilized armatures mounted on the shaft next to the rotor opposite a second wound stator. These devices are also called "circular rotating transformers." The second wound stator is thus the primary and the armature is the secondary. High frequency current is fed to the primary of this transformer. Electronic control and waveforms to drive a rotating transformer machine are claimed in U.S. Pat. No. 3,629,689. The output from the rotating armature secondary is then rectified and processed by electronic components attached to the rotating shaft and then fed to the rotor winding.

The circular rotating transformer and its associated electronic component necessary to feed exciter current to the rotor winding require extra shaft and stator space. This reduces power and torque density. The electronic component must be secured to the shaft during the manufacturing process and dynamically balanced. This increases the cost of manufacturing. The primary of this transformer requires a high frequency current source about 20 KHz with a modulator sufficient to produce an appropriate exciter current to feed the rotor winding to enable effective electronic control.

Another strategy to construct a brushless synchronous double-fed motor is to have a stationary flux exciter winding separated from am unwound rotor having magnetic material poles by an air gap. Such a rotor was patented by Mackallor, U.S. Pat. No. 3,484,635 1969 assignee: US Navy. In this invention, a hollow rotor is claimed coaxially surrounding a wound station exciter. The flux flows through an air-gap inside the rotor to magnetic material poles on the rotor. The exciter is held stationary by a stationary shaft that also brings leads to the exciter coil. The rotor conveys its motion through a rotating shaft opposite the stationary shaft. Other inventors use the same general rotor structure for a stationary flux exciter.

U.S. Pat. No. 4,250,424 1981, assigned to Hatachi Ltd., may give us some insight into the problem. This patent offers improvements in such a rotor with a stationary exciter to withstand centrifugal force. The design and manufacture of solid rotors is often difficult to withstand centrifugal force, magnetic force, and thermal cycling. These facts can cause the rotor to bulge and creep into the rotor-stator aid-gap. A hollow rotor can only be more prone to suffer under such effects. Once the rotor creeps into the rotor-stator air gap, the situation becomes unstable.

Centripetal acceleration can be quite high even in moderately fast motors with medium radius rotors. Assume that a rotor with a 10-cm radius rotating at 3600 RPM. The centripetal acceleration $C_p=\omega^2 r$, where $\omega$ is the speed in rads/sec and r is the radius in meters, give $C_p=14,212$ m/sec$^2$. Expressing this in gs—the earth gravitational acceleration—9.8 m/sec$^2$, gives 1,459 gs.

U.S. Pat. No. 3,629,689 (1983) an alternator assignee: Motorola, claims a stationary exciter that feeds flux to a rotor. This Patent revels in its disclosure that U.S. Pat. Nos. 3,614,593, 3,617,857 and 3,69,689 also alternators assigned to Motorola and employing circular rotating transformers are "volumetric" failures.

The slip-ring-brush problem has encouraged the use of permanent magnet synchronous motors. Since these motors use permanent magnets in their rotors, they have no need for exciter current. They are brushless.

Synchronous permanent magnet motors can be divided onto two categories—SPM (Surface Permanent Magnet) and IPM (Interior Permanent Magnets). SPMs have permanent magnets poles on the surface of their rotors. IPMs have permanent magnets buried under high permeable material in their rotors.

IPMs are capable of greater speed range and torque. As the motor increases its torque angle, the saturation of the permeable material produces a reluctance torque at an angle to the alignment torque—the direct torque produced by the magnet attraction of the stator. The total torque is the vector sum of these torque vectors. This technology is often called "vector control."

As the direct torque angle advances, the reluctance torque opposes the alignment torque. After the torque angle reaches about 90-degrees, the reluctance torque adds to the alignment torque. The net result is to increase the total torque about 15-percent. The vector addition of direct torque and reluctance torque vectors is a hardware control strategy.

Some electronic control is possible with IPM synchronous motors. By monitoring shaft position, the stator voltage, current and phase, the stator input voltage can be adjusted. Flux excitation cannot be controlled electronically since the rotor flux is produced by permanent magnets. Rotors with windings are difficult and limited in dynamical balancing. A high degree of dynamic balance is achievable in IPM motors to reduce vibration and noise.

High torque synchronous IPM motors and generators are made using rare earths such as neodymium and samarium. Neodymium-iron-boron (NdFeB) permanent magnets can produce field strength over 1.5 teslas. Neodymium traction motors have gained wide success in electric hybrid vehicles. Such high field strength produces high lock (start) torque.

Neodymium permanent magnets have a significant draw back, they have a low curie point—temperature, about 320° C., at which they lose residual magnesium. This often means that machines that use neodymium permanent magnets require cooling and mandatory shut down if the curie point is approached. Aerospace-defense machines use samarium-cobalt (SmCo) permanent magnets since the have a curie point of 860° C. Samarium is thus on the US Strategic Materials List. These problems have encouraged a search for alternative rare earth-less motors including those with stationary exciters.

Recently (Mar. 5, 2913) U.S. Pat. No. 8,390,168 assignee: UT-Battle, LLC, Oak Ridge, Tenn. (US) claimed a synchronous motor employing a stationary exciter imbedded in a hollow rotor. See FIG. 2 (Prior Art). This is FIG. 7 in the original patent and is similar to previous attempts to use hollow rotors to hold stationary exciters.

One of the embodiments favored by this patent is an electric vehicle traction motor. Current IPM traction motors are capable of speeds of 5700 RPM. Depending of the radius of the rotor this could mean many thousands of gs centripetal acceleration. This could produce tremendous force on the uncluttered rotor 120. This could be especially critical where this hollow rotor transfers torque to the rotatable shaft 712. The slender connection to this shaft could thus be twisted and pulled by such force. This would likely compromise air gaps 704 and 706 and causes the machine to seize.

FIG. 4 (Prior Art) which is FIG. 11 in the same Patent shows asymmetrical rotor "tooth shape" poles. Such an uneven longitudinal distribution of mass can only create a component of force directed towards the coolant shaft 124, FIG. 3 (Prior Art) which can only exacerbate the problem.

Current and recent textbooks (such as *Electric Power and Controls*, Skvarenina, DeWitt, Pearson-Prentice Hall, 2004 ISBN 0-13-113045-5) portray brush slip-ring, double-fed synchronous machines as providing the highest density power-torque and providing excellent control by offering a direct feed to the rotor exciter at the expense of high maintenance. In such textbooks, brushless double-fed synchronous machines are considered synonymous with those having circular rotary transformer exciters.

Stationary flux exciters are never mentioned in academic papers, dissertations or technical journals. This should be surprising since brush machines and stationary exciter machines have identical equivalent circuits—except brush machines should have a noise generator in their exciter circuit to represent brushes. There must be some reason that stationary exciter machines fail since they only seem to exist in a string of paper patents. Certainly, stationary flux exciter machines have not gained commercial success since their conception in the late '60s.

The cost of inverters is falling, the size and cost of microprocessors is falling as their sophistication increases. Market forces can only demand an efficient high power-torque density brushless variable speed machine. It is time to look at stationary exciters without hollow rotors.

SUMMARY

A synchronous machine that can function as a motor or generator with high efficiency and adjust to both capacitive and inductive loads and sources. In several embodiments it can provide a high torque motor with a large speed range.

Advantages

The current invention offers all the advantages of double-fed synchronous machines such as high power-torque density without the cost of maintenance and noise produced by the brush-ring assembly. Its low noise stationary exciter input opens applications such as countering torque ripples and harmonics.

and flux exciters. Front exciter core 24F and front exciter contact 26F are shown. Rear exciter core 24R and 26R rear exciter contact 24R are shown.

The rotor is shown sandwiched between 52F and 52R and comprises front rotor poles 46F, rear rotor poles 46R, front wide gaps 56F and rear wide gaps 56R.

Figure 7:
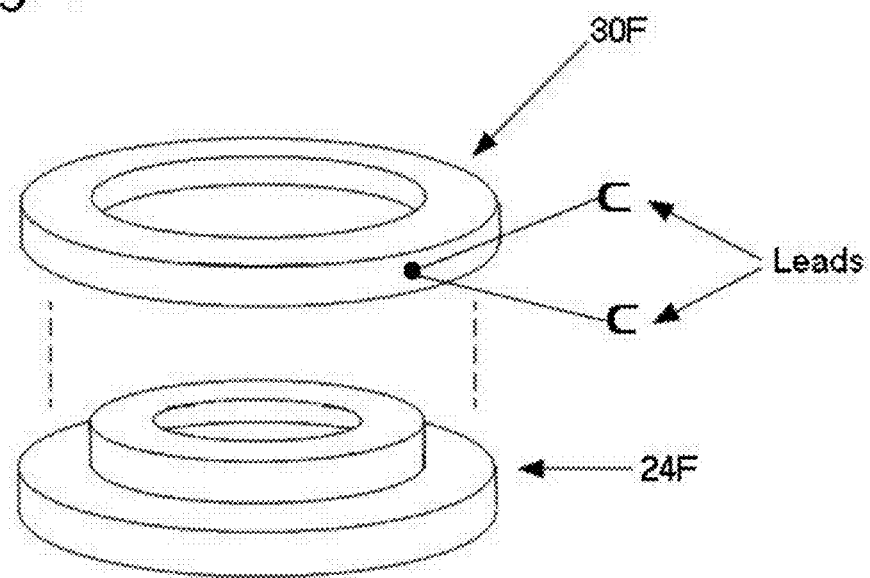
FIG. 7 shows an exploded perspective view of the exciter core and the exciter core.

FIG. 7 shows a perspective view exploded to separate the front exciter winding 30F and the front exciter core 24F. This view could be inverted to show the rear exciter winding 30R and the rear exciter core 24R.

Figure 8:
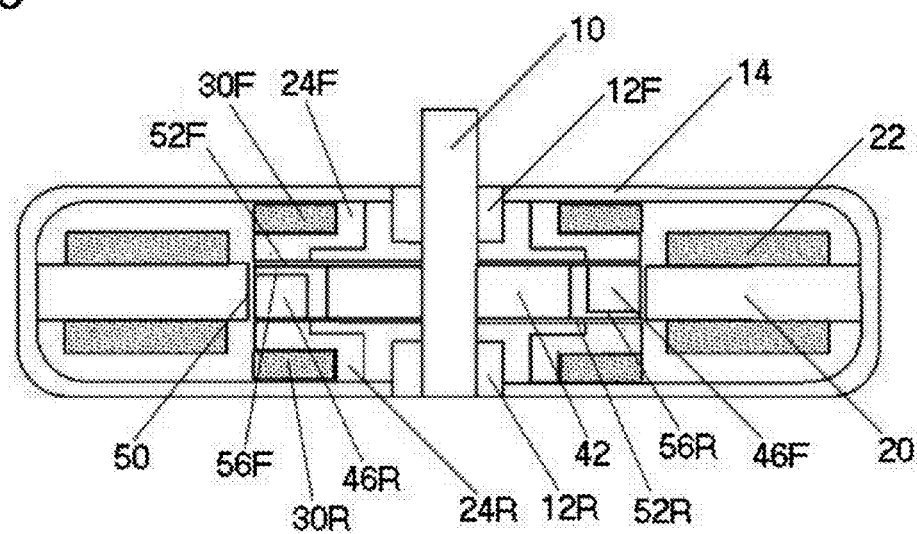
FIG. 8 shows a front slice view of the machine.

FIG. 8 shows a slice view of the machine. The shaft 10 is held in place by front barring 12F and rear bearing 12R which are attached to housings 14. This shaft holds the rotor comprising the rotor hub 42, front rotor poles 46F, rear rotor poles 46R, front wide gaps 52F and rear wide gaps 52R. Front exciter winding 30F and rear exciter winding 30R are shown next to front exciter core 24F and rear exciter core 24F respectively which are next to front exciter air gap 52F and rear exciter air gap 52R respectively. Stator winding 22 is shown next to the stator core 20 which is next to the stator rotor air gap 50.

Figure 9:
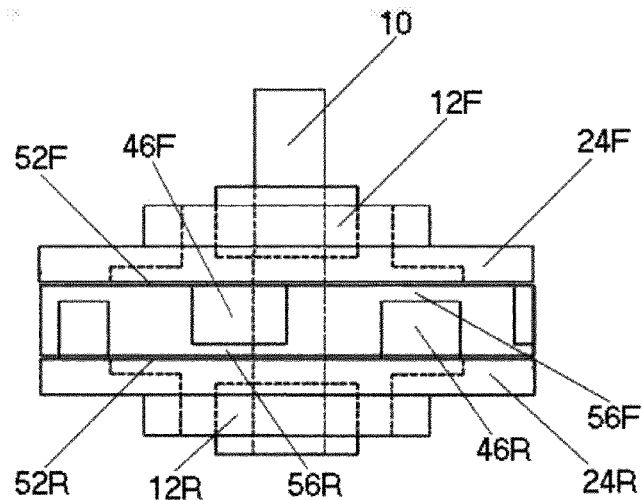
FIG. 9 shows a front view of the machine with the housing, stator, stator winding and exciter winding removed.

FIG. 9 shows an x-ray view of the machine with the housing, stator winding and exciter windings removed. Shaft 20 is held secure and free to rotate by front bearing 12F and rear bearing 12R. This shaft holds the rotor comprising front poles 46F, rear poles 46R, front wide gaps 56F, and rear wide gaps 56R. Front exciter air gap 52F and rear exciter air gap 52R are shown next to the front and rear exciter cores respectively. The rotor hub and poles away from the viewer are not shown as they would over complicate the drawing.

Figure 10:
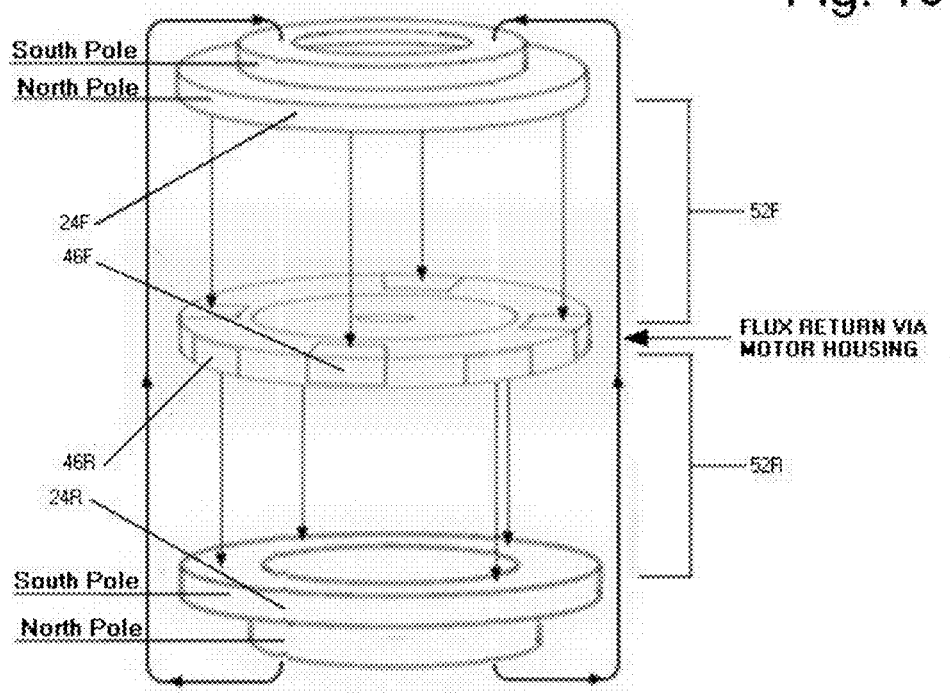
FIG. 10 shows a perspective view of the rotor and exciter cores exploded along the radial air gaps with a supper imposed schematic showing flux flow. Note: the flow of flux from front poles to the stator and back to rear poles is not shown as this would over complicate the drawing.

FIG. 10 shows a perspective view the front exciter core 24F and the rear exciter core 24R exploded along the front exciter air gap 52F and rear exciter air gap 52R. A flux flow diagram is superimposed over the solid components. The flux flow Drawings--Reference Numerals

| 10 | shaft | 12F | front barring | 12R | rear barring |
|---|---|---|---|---|---|
| 14 | housing | 20 | stator core | 22 | stator winding |
| 24F | front exciter core | 24R | rear exciter core | 26F | front exciter contact |
| 26R | rear exciter contact | 30F | front exciter winding | 40 | rotor shaft well |
| 42 | rotor hub | 44 | rotor substrate | 46F | front rotor pole |
| 46R | rear rotor pole | 50 | stator-rotor air gap | 52F | front exciter air gap |
| 52R | rear exciter air gap | 56F | front wide gap | 56R | rear wide gap |

DETAILED DESCRIPTION OF THE PREFERRED EMBODIMENTS

Figure 5:
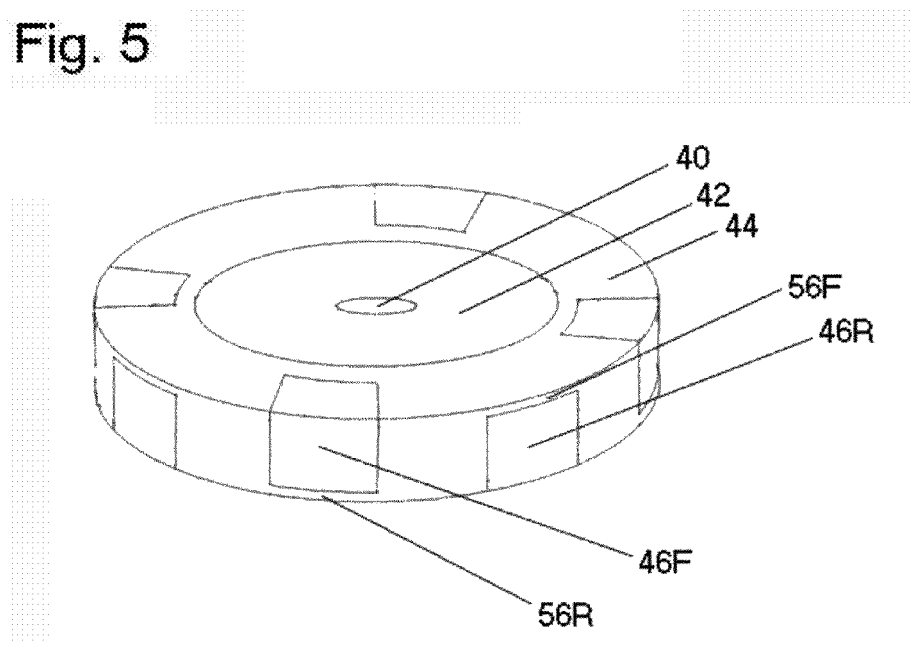
FIG. 5 shows a perspective view of a rotor.

FIG. 5 is a perspective view of the rotor of the current invention. The shaft well 40 permits passage of the shaft and couples it to the rotor hub 42 which transfers torque to the shaft. The outer rim of the rotor consists of the rotor substrate 44 in which are imbedded front rotor poles 46F (shown at the top of the rotor in this drawing) and rear rotor poles 46R (shown at the bottom). All of the front rotor poles 46F have one side flush with the front flat side of the rotor and their curved side flush with the outer rim of the rotor. Likewise, all of the rear rotor poles 46R have one side flush with the rear flat side of the rotor and their curved side flush with the outer rim of the rotor.

Rotor poles are shorter than the length of the rotor so that each front rotor pole is flush with the front of the rotor but has a rear wide gap 56R at its other end. Likewise, each rear pole is flush with the rear of the rotor, but has a front wide gap 56F at its other end.

Figure 6:
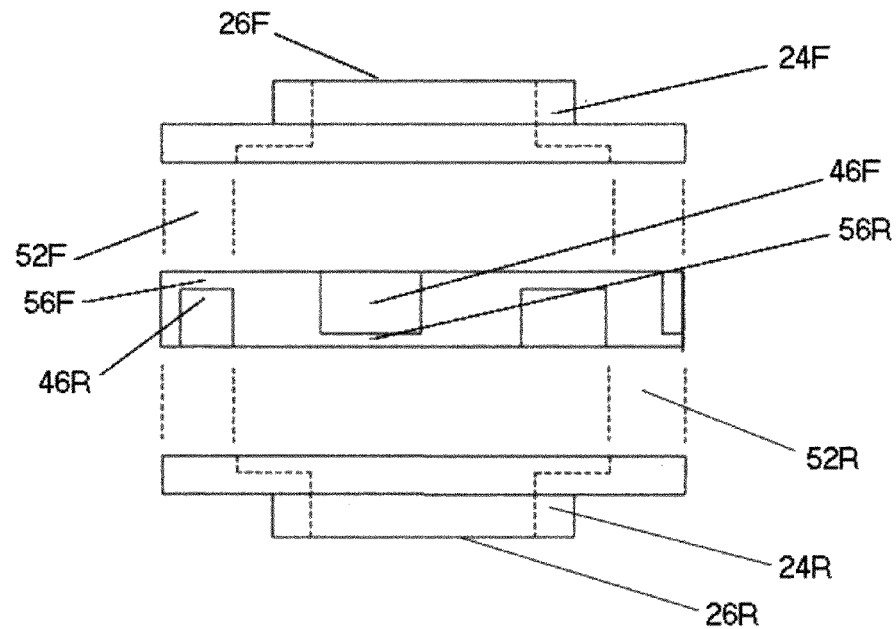
FIG. 6 shows a front view of the rotor and front exciter core exploded along the radial air gaps. (Only the front poles of the rotor are shown.)

FIG. 6 shows a view exploded view along the front exciter air gap 52F and the rear exciter air gaps 52R between the rotor from front poles 46F to the stator core and back to rear poles 46R is not shown as it would over complicate the drawing.

Operation—FIG. 5, 6, 7, 8, 10

FIG. 5 is a perspective view of the rotor of the current invention. The shaft well 40 permits passage of the shaft and couples it to the rotor hub 42 which transfers torque to the shaft. The outer rim of the rotor consists of the rotor substrate 44 in which are imbedded front rotor poles 46F (shown at the top of the rotor in drawing) and rear rotor poles 46R (shown at the bottom of the rotor in drawings). All of the front rotor poles 46F have one side flush with the front flat side of the rotor and their curved side flush with the outer rim of the rotor. Likewise, all of the rear rotor poles 46R have one side flush with the rear flat side of the rotor and their curved side flush with the outer rim of the rotor.

Rotor poles are shorter than the length of the rotor so that each front rotor pole is flush with the front of the rotor but has a wide gap at its other end. Likewise, each rear pole is flush with the rear of the rotor, but has a wide gap at its other end.

FIG. 6 Front rotor poles 46F are magnetically polarized by flux passing through the front rotor-exciter air gap 52F. Likewise, rear rotor poles are polarized by flux through the rear rotor-exciter air2F gap 52R. Flux will readily flow through the low reluctance axial air gaps at the flush ends of the poles, but it will be effetely blocked by the high reluctance wide gaps at each pole opposite end. The rotor poles will thus be magnetically polarized such that opposite poles are interleaved around the rotor.

FIG. 7 is a perspective view of an exciter core 24 showing an exciter flux surface 24S which sends or receive flux through the front rotor exciter air gap 52F (not shown here) or the rear exciter air gap (not shown here) depending on magnetic polarity.

FIG. 8 shows front exciter winding 30F energizes front exciter core 24F which feeds flux across front exciter air gap 52F to front rotor poles 46F thus polarizing them as north poles. Although the flux flows readily through the front exciter air gap since it is a small distance and offers a low reluctance, the flux is blocked by the front wide gaps 56F which are much longer and presents a high reluctance to the flux.

At the same time rear exciter winding 30R energized rear core 24R which receives flux across rear exciter air gap 52R and polarizes rear rotor poles 46R to south poles. This flux circuit is completed by a return path through the housing 14 through contacts with flat annular area around the front bearing 12F with the front exciter core 24F and around the rear bearing 12R with the rear exciter core 24R, Flux must also flow from the front rotor poles 46F through the stator rotor air gap 50 to the stator core 20 and back though this air gap to the rear rotor poles 46R.

The front exciter winding 30F and the rear exciter winding 30R must contain sufficiently size wire to carry the required current and have the number of turns such that it has enough amp-turns to provide adequate flux. The cross sectional area of the flux circuit should be large enough to remain well below saturation except the poles which might operate on the saturation knee for high torque embodiments of the current invention. Field strengths of approximately 1.5 teslas can be reached on the saturation knee enabling high torque embodiments that can compete with rare earth permanent magnet poles.

The stator winding 22 contains legs for each of the polyphase cycles that must be accommodated. Usually three-phase is used. When the machine functions as a motor, electrical power is fed into the stator winding. This creates a rotating field. With the proper excitation, the rotor turns and delivers mechanical power to the shaft which can drive a load. When the machine functions as generator, the stator winding is connected to a load. With the proper excitation; mechanical power from a prime mover delivered to the shaft, will deliver electrical power to the load.

FIG. 10 shows the flux circuit. Flux flows from the exciter core 24F through front exciter air gap 52F to front poles 46F to the stator core (not shown) back to the rear poles 46R. It then flows through rear exciter air gap 52R to rear exciter core 24R. The flux then returns via the housing not shown to complete the flux circuit.

Additional Embodiments

Proportions used in the drawing are only given as examples. Such proportions will vary for particular embodiments.

The area presented by the flush sides of poles can be varied within the scope and spirit of the current invention. Larger areas may be necessary especially for long rotors—those with a low ratio of radius-to-length. Many shapes are possible for poles having a large flush end that tapper toward the wide gaps that can be interleaved about the rotor rim and can pass flux from an air gap without saturating and then distributing this flux on their curved surface adjacent the stator-rotor air gap.

An electric vehicle traction motor must be efficient to have range and reduce its load on energy resources. These traction motors must also be efficient generators since regenerative braking must be able to recycle unspent kinetic energy.

An electric vehicle motor must be capable of accelerating into traffic from rest, be able to run efficiently at highway speeds, and be able to run in reverse. Such a motor should be brushless since using brush slip rings to feed current to a rotor is inefficient and requires high maintenance.

One of the greatest challenges to electric vehicle traction motors is "stop and go" traffic. The traction motor must switch to a generator to accomplish regenerative braking. Current IPM traction motors have only about 50% efficiency operating as a motor or generator. The charge-discharge cycle of lithium-ion has an efficiency of about 85%. Thus the overall efficiency to recycle kinetic energy is thus (0.5×0.85×0.5) % or about 21%.

With proper care and feeding, double-fed synchronous machines have efficiencies greater than 90%. The overall energy recycle efficiency with a double-fed synchronous motor is about 69%. This is not great if repeated too many times.

A sophisticated controller in an electric vehicle with an electronically controlled motor could respond to over use of braking by working with the vehicles semi-autonomous ranging anti-collision system to set a steady pace. If such systems were standard, traffic would self-organize into smooth high energy efficient streams. The uses of microprocessor controllers with electronic controlled motors gives an agilely that cannot be approached by stand-alone dedicated hardware control such as vector control.

Figure 1:
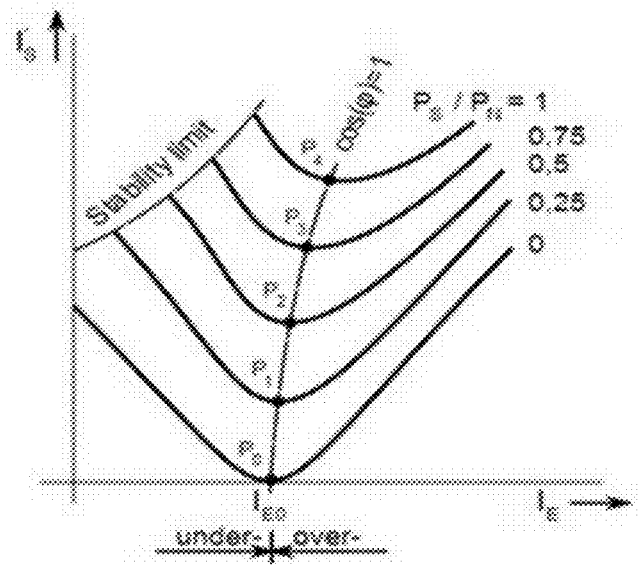
FIG. 1 (Prior Art) shows V curves for a double-Fed synchronous motor.
Figure 2:
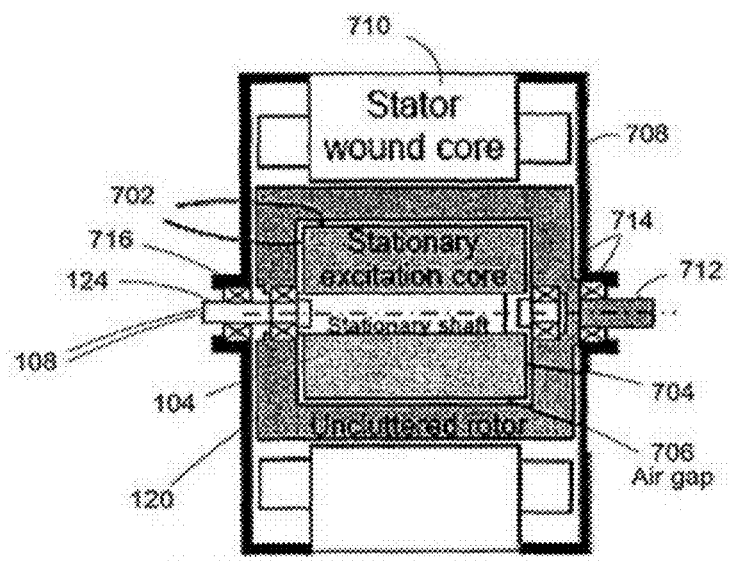
FIG. 2 (Prior Art) shows a Stationary excitation core, rotor and stator from U.S. Pat. No. 8,390,168.
Figure 3:
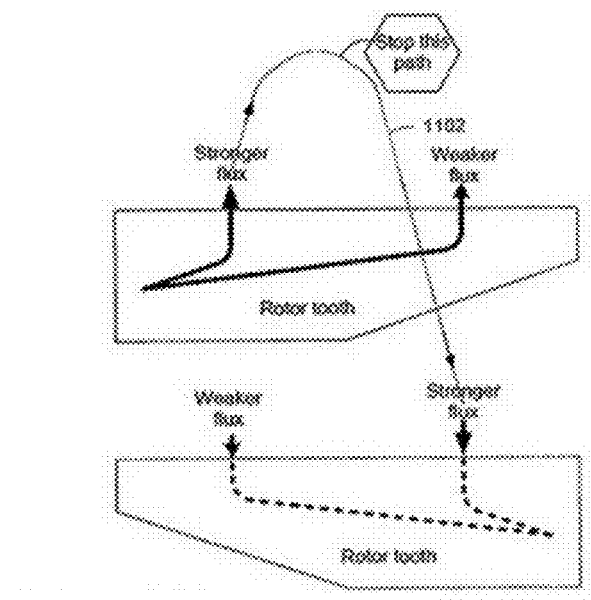
FIG. 3 (Prior Art) shows Rotor poles and flux path.
Figure 4:
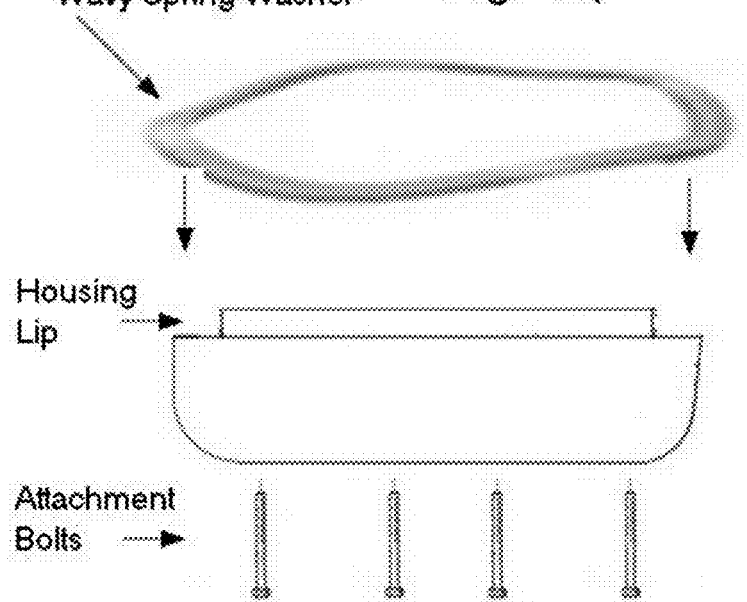
FIG. 4 (Prior AR) shows partial motor housing, Attachment Bolts, Housing Lip, and Wavy Spring Washer.

FIG. 1 (Prior Art) shows a family of V-curves for a double-fed synchronous motor. A generator has a different set. These curves show how double-fed synchronous motors can be controlled by adjusting the exciter current with respect to stator current. Usually a power factor near unity is selected which optimizes efficiency. Double-fed synchronous machines are renowned for power factor control.

Super capacitor technology is a vanguard technology that may soon offer high charge density capacitors. They may provide temporary or even long term storage in electric vehicles. These capacitors promise a 98% efficiency. With the proper excitation current, this embodiment of the current invention can charge this pure capacitive load with a net power factor near unity Microprocessor and instrumentation technology is well developed to design and construct a motor controller (microprocessor with appropriate software) for the current invention. The current invention provides this controller a wide band low noise channel to the flux exciter from DC to tens of KHz. This will permit the controller to respond quickly to such events as transient mechanical loads, harmonics and torque ripple. The controller may monitor such parameters as torque angle, stator voltage, and current and instantaneous phase relation.

Current hybrid electric vehicle traction motors and wind generators use rare-earth permanent magnets poles in their rotors. This invention replaces these poles with soft magnetic material energized by a remote flux source. By driving the flux source near saturation, the field strength in these poles can equal or surpass that of rare earth permanent magnets to produce high torque at slow speeds, yet the flux source strength can be reduced to permit constant power output, high efficiency, and unity power factor over a wide range of speeds.

Another embodiment of the current invention can function as a wind generator. The machine can be connected to the grid and brought up to synchronous speed as a motor. With the proper dc exciter current, a microprocessor directs the machine to become a generator feeding power to the grid. The microprocessor monitors the shaft angle of the generator and adjusts the pitch of the turban blades to maximize power transfer. The shaft angle also gives torque ripple information. The microprocessor then adds an ac components to the exciter feed that reduces this ripple and noise.

Manufacturing an Embodiment

Manufacturing the rotor for electric vehicle traction motor requires some special consideration since this embodiment requires special consideration to accommodate high sheer to transfer high torque to the shaft. The hub can be made of steel or titanium steel. The rim substrate can be made of a nonmagnetic material such as aluminum or titanium aluminum. The pole pieces can be made of a soft high permeable material such as electric steel or silicon steal.

The hub may need to be keyed so that a hydraulic press can form them together. The difference in the thermal coefficient of expansion must be taken into consideration when choosing the type of keying which is well known in the art.

The cavities in the outer rim that will hold the pole pieces can be machined with CNC (Computer Numerical Control) tools. These cavities should have substrate material filing the wide gaps. This will accommodate press fitting the pole piece and streamlining the rotor. The substrate has a relative permeability of about one (i.e. about the same as free space permeability).

If the substrate or the pole pieces are electrically conductive they should be laminated on the flat sides of the rotor to eliminate eddy currents, CNC routing can form ridges such that conductive bands are coaxial to the shaft. Routing only needs to cut a depth equal to several exciter air gap lengths since the flux intensity falls off with depth. The curved side of the rotor does not need to be laminated since the field at the poles moves with the rotor.

The shaft should be machined from harden steal or some other harden metal or alloy. It should contain a key to hold the rotor. The key should be adequate to handle sheer when the transfer of torque is high. The rotor can be placed on the key by a hydraulic press.

Wound rotors are difficult to produce with a high degree of dynamic balance. Solid structure unwound rotor can be brought to a much higher degree of balance using CNC machining tools. This is particularly necessary in traction motors. These motors must start overcoming lock torque and reach cursing speeds of 5400 RPM. At this speed the outer rim of the rotor is subjected to thousands of gs of centripetal acceleration which, if not dynamically balanced, can cause severe vibration.

A jig should be constructed with retractable arms to position the rotor as it is pressed on to the keys. This jig will precisely position the rotor. The shaft and rotor can then be placed temporarily in a set of two bearing. Each bearing is blocked up against a force transducer. An auxiliary motor turns the shaft as the shaft angle is monitored by a shaft encoder. The shaft is temporarily stopped at angles at which the transducers found eccentricities. The CNC milling tools remove small amounts the rotor until it has achieved a high degree of dynamic balance. All of these procedures are well known in the art.

Several "nut and bolt" issues are not included in the drawing since they often depend of a particular embodiment of this invention or will over complicate the drawing and are well known in the art. In this particular embodiment of the current invention, the flux exciter can be secured to the motor housing by bolts. The flat machined surfaces of the exciters opposite the exciter air gaps are thus held against flat machined surfaces of the housing thus assuring the free flow of flux through the housing.

FIG. 5 (Prior Art) shows the housing lip on the rear section of a machines housing. This section is designed to interlock with mating lips on the front section of machine housing (not shown). Attachment Bolts are shown at the bottom of the drawing. These bolts can be pressed upward to secure posts (nor shown) on the front section of the machine housing. These posts can be fitted with nylon collars or similar locking devices to insure that the bolts lock securely. Before the lips are mated a wavy spring washer is placed between the housing lips. This spring should be constructed of a high resilient material such as beryllium copper alloy.

The height of the lower shaft bearing in this embodiment of the current invention is adjustable and lockable to a front section of the housing with a mating lip. The side of these lips are machined to present a low reluctance flux path and to by attachment bolts shown at the bottom of this drawing.

This embodiment of the current invention requires a cable egress for the stator and exciters leads. Such an egress should incorporate a strain relief clamp.

Assume that the upper lip fits over the lower lip; the lower lip should then have a tapper or beveled edge at the top of the lip so fitting the lips together is not difficult.

The lower motor housing can be set on a special fixture having properly positioned motorized bolt drivers controlled by CNC tools. The rear air gap is then shimmed, then set and the shims are removed.

The spring is set over the lower motor housing lip. The upper motor housing is then set on the spring. The CNC tools will start tightening the bolts against the force of the spring. A belt will be attached to a pulley mounted on the protruding shaft. This belt will be connected to a pulley on an auxiliary motor.

Two wires from a leg of the stator are connected to a pulse height discriminator. As the auxiliary motor turns the shaft, the CNC tools adjust the attachment bolts until the discriminator detects equal positive and negative pulses indicating that the north and south poles on the rotor are equal and the air gaps are equal and the machine is ready.

In the field service technician might uses a similar fixture except that CNC motor drives could be replaced by manual access to bolt drivers and the pulse height discriminator could be replaced by two peak detectors and two volt meters.

The invention claimed is:

1. A synchronous brushless, permanent magnet-less electric machine comprising:
   a stator, a rotor, two stationary flux exciters,
   said rotor is essentially the shape of a right circular cylinder comprising two flat sides and a curved surface, the rim of said rotor consists of non-magnetic material whereas said rotor comprises a coaxial hub consisting of a material sufficient to transmit torque to said shaft whereas said hub comprises a well and whereas said well comprises an opening through which said shaft is attached,
   a plurality of evenly spaced poles consisting of soft magnetic material are evenly spaced around said rim, the length of said poles is equal to the distance between the flat sides of said rotor minus a wide gap, said wide gaps are long enough to present high reluctance sufficient to block flux flow, said poles are arranged such that adjacent said poles have flush ends at opposite flat sides of said rotor, the flat sides of said outer rim are disposed between the two stationary flux exciters at a distance small enough to create two axial air gaps with reluctance small enough to permit flux to flow readily to nearby said flush ends of said pole ends, so that adjacent poles are of opposite magnetic polarity, said stationary flux exciters comprise a high permeability core and an electrical winding to energize said core to a high permeable flux return attached to said stationary flux exciter, said stator is disposed around said curved side of said rotor so as to form a radial air gap with reluctance small enough to permit flux flow.

2. The synchronous brushless, permanent magnet-less electric machine of claim 1 wherein said stator is fed an alternation current so as to create a rotating magnetic field which transmits torque to said rotor making said electric machine a motor.

3. The synchronous brushless, permanent magnet-less electric machine of claim 1, wherein said stator is connected to a load so as to receive a rotating magnetic field from said rotor making said electric machine a generator.

4. The synchronous brushless, permanent magnet-less electric machine of claim 1 wherein the poles start on the flush end with large areas and taper down cross sectional area to wide gaps so as to distribute flux to achieve an equal field strength on the curved side of said poles.

5. The synchronous brushless, permanent magnet-less electric machine of claim 1, wherein cross-sectional area of the flux exciter core and flux return are sufficiently large enough that said return remain below saturation as the field on the poles reach the saturation knee.

* * * * *